United States Patent [19]
Kühnelt

[11] Patent Number: 6,004,383
[45] Date of Patent: Dec. 21, 1999

[54] MEMBRANE DRYER FOR DRYING MOIST AIR WITH VALVED SCAVENGER DUCT

[75] Inventor: Herbert Kühnelt, Vienna, Austria

[73] Assignees: HYGRAMA AG, Rotkreuz, Switzerland; ULTRATROC GmbH, Flesburg, Germany

[21] Appl. No.: 09/150,063

[22] Filed: Sep. 9, 1998

[30] Foreign Application Priority Data

Sep. 10, 1997 [AT] Austria ..................... 1526/97

[51] Int. Cl.⁶ .......................... B01D 53/22; B01D 53/26
[52] U.S. Cl. ............................. 96/8; 96/10; 95/52
[58] Field of Search ................. 95/45–54; 96/4, 96/7, 8, 10

[56] References Cited

U.S. PATENT DOCUMENTS

| | | | |
|---|---|---|---|
| 3,735,558 | 5/1973 | Skarstrom et al. | 95/52 X |
| 4,808,199 | 2/1989 | Yearout | 96/10 X |
| 4,944,776 | 7/1990 | Keyser et al. | 95/52 X |
| 5,030,251 | 7/1991 | Rice et al. | 96/8 X |
| 5,131,929 | 7/1992 | Brockmann et al. | 95/52 |
| 5,160,514 | 11/1992 | Newbold et al. | 96/8 |
| 5,259,869 | 11/1993 | Auvil et al. | 95/52 |
| 5,411,662 | 5/1995 | Nicolas, Jr. et al. | 96/10 X |
| 5,500,036 | 3/1996 | Kalthod | 96/8 X |
| 5,525,143 | 6/1996 | Morgan et al. | 95/52 |
| 5,605,564 | 2/1997 | Collins | 95/52 |

FOREIGN PATENT DOCUMENTS

| | | | |
|---|---|---|---|
| 3-186315 | 8/1991 | Japan | 96/8 |
| 6-134244 | 5/1994 | Japan | 96/8 |
| 6-134245 | 5/1994 | Japan | 96/8 |
| 6-134246 | 5/1994 | Japan | 96/8 |

*Primary Examiner*—Robert Spitzer
*Attorney, Agent, or Firm*—Watson Cole Grindle Watson, P.L.L.C.

[57] ABSTRACT

A membrane dryer apparatus for moist air includes a housing (1) that contains a tubular fabric strand bundle (7) of tubular fabric strands (8) made of selective absorption material through which air to be dried flows, water vapor diffusing through the fabric and collecting on its outside. A portion of the dried compressed output air is channeled off near the discharge (12) of the membrane dryer and passed through a scavenging air duct (14) having a throttle (16) and passed around the outside of the fabric strand bundle to scavenge moisture and remove it through discharge openings (17, 18) to the outside air. To limit consumption of scavenging air, an independent shut-off valve (19), working as an airflow sensor, is installed in the output air duct (13), and this shut-off valve (19) opens only when output air is actually extracted by a user. This shut-off valve (19) regulates at the same time the scavenging air duct (14) whereby the shut-off valve (19) is connected to a scavenging air valve (22) which is actuated by a control line (23) that in turn is regulated by the shut-off valve (19) and branches off from the output air duct (13). This causes scavenging air to flow through the scavenging air duct only when the shut-off valve (19) is open and output air is discharged from the membrane dryer apparatus.

5 Claims, 1 Drawing Sheet

MEMBRANE DRYER FOR DRYING MOIST AIR WITH VALVED SCAVENGER DUCT

BACKGROUND OF THE INVENTION

1. Field of the Invention

The invention relates to a membrane drying apparatus for drying moist air which includes a housing that has an intake connection for incoming air to be dried and a discharge connection for discharging dried air.

2. The Prior Art

A membrane drying apparatus for moist air which includes a housing containing a tubular fabric strand bundle that is made up of tubular fabric strands composed of selective absorption material for extracting water vapor from compressed air to be dried by channeling the air through the fabric strands of the fabric strand bundle, and which also includes a scavenging air duct branching off from a point downstream of the fabric stand bundle and containing a throttle to allow expansion of the scavenging air, is well known. In such apparatus the scavenging air duct leads back to the fabric strand bundle inside the housing where expanded scavenging air passes along the outside of the tubular fabric strands in an opposite direction to that of the air stream inside the fabric strands, the scavenging air absorbing the diffused water vapor which has passed through the fabric strands and subsequently flowing to the outside air near the intake area of the fabric strand bundle. A self-acting shut-off valve or spring-loaded back pressure valve is installed near the discharge area which is controlled by the output air stream and is used as a flow sensor that also controls the scavenging air duct. The output air can be used as a working medium in many types of mechanical systems.

Such known membrane dryers provide a significantly decreased dew point through the expansion of the channeled scavenging air, whereby the scavenging air absorbs diffused moisture from the compressed air as the scavenging air flows in a reverse direction around the fabric strands. Through this method, the pressure dew point may be typically decreased by approximately 30° to 50° centigrade depending on pressure and scavenging air amount. One disadvantage with this type of apparatus, however, is the continuous need for scavenging air, which may be 15 to over 30% of the total air supply for the membrane dryer. Regardless of whether the output air is needed continuously or only partially, the need for scavenging air remains the same since it is gauged to the maximum airflow as long as the dryer is not turned off.

It is known to decrease the scavenging air supply by automatically controlling the output airflow and accordingly determining the individual scavenging air supply. However, an electronic device is necessary to accomplish this function, which is programmed by using the results of extensive measuring data and knowledge about typical performance of the membranes and module, which is the fabric strand bundle. Through pulsating of a valve that is operated by the electronic control device, only as much scavenging air is supplied as needed for drying of the diffused output air. A cost reduction can be thus obtained for the compressed air drying process, especially during periods of high performance demands or during highly changing demands for airflow. To accomplish this function, there is a pre-programmed electronic peripheral device required that is individually controlled by an outside power source, which in turn considerably increases costs for the entire apparatus. It also makes the apparatus more complicated and decreases operational safety.

A membrane dryer apparatus is disclosed in JP 09 957 043 A wherein a shut-off device which controls the scavenging air duct is actuated by the incoming air stream, thereby opening the scavenging air duct proportionally to the output airflow. By using this type of membrane dryer apparatus there is no need for outside controls and an outside power source. The scavenging air stream is adjusted independently according to the particular air requirement and is cut off when there is a lack of output air discharge. However, the scavenging air stream is always directly coupled with the output air stream in this type of design. It is particularly difficult in dryers with a high volume of airflow to design the control unit, the effective air sensor, and the scavenging air valve in a manner to function satisfactorily.

The object of the present invention is to adjust air consumption to the scavenging air requirement of the first mentioned type of membrane dryer apparatus in a simple way by using two phases, even at high volume air requirements, without a need for external intervention, outside energy sources or a complicated peripheral device.

The object is achieved by installing a separate scavenging airflow valve in the scavenging air duct, for example a 2/2-way directional control valve, that is actuated by the shut-off valve via a control line which branches off from the output air duct. This type of design is also suited for larger size membrane dryers whereby the shut-off valve simply opens and closes a control line with a relatively low airflow requirement. Such a control device is especially advantageous in decentralized dryers for protecting the equipment that is very sensitive and/or is exposed to large fluctuations in temperatures. In many cases, the air requirement does not fluctuate by much in such applications. However, such devices are only in operation at certain periods and with a delay in-between. The dryer equipment of this invention is of especially great advantage in such situations.

The scavenging air valve can be advantageously designed as a normally closed membrane valve which is biased to close by pressure of air flowing from a point downstream of the shut-off valve and is biased to open by pressure of air flowing from a point upstream of the shut-off valve. The pressure differential at the shut-off valve is used in this case to regulate the membrane valve, whereby the pressure differential depends largely on the amount of airflow. By having a relatively large membrane area compared to the smaller control area of the scavenging air duct, the amplification factor is affected in such a manner that a very simple scavenging airflow control may be attained.

According to the invention, the control line has a continuously open vent nozzle that ensures that during closing of the control line, the control line and therefore also the control side of the scavenging air valve is decompressed, thus allowing the scavenging valve to close. The vent nozzle should preferably open into the scavenging air duct downstream of its throttle.

Another aspect of the invention is for a bypass duct for the scavenging air to be located at the discharge side of the fabric strand bundle and placed upstream of the shut-off valve. An adjustable throttle can be installed in the bypass duct, which branches off from the output air duct and leads to the scavenging air duct. This small dimensional circumvention of the scavenging air line causes the membrane dryer to always need a very low amount of scavenging air, which also ensures removal of moisture from the fabric strand bundle even when the membrane dryer is in an operational mode below the tolerance level of the shut-off valve. The dryer will thereby remain at continuous operational readiness and will ensure that, with any new response to needs for drying and new airflow, the required dried air can be obtained immediately. During longer delays in dryer operation, moisture may diffuse through the tubular fabric strands because of compressed air within the fabric strands. This moisture is removed also during non-operational periods of the membrane dryer without considerable consumption of scavenging air so that the membrane dryer, according to the invention, remains continuously in operational readiness through this simple arrangement.

The invention will be better understood by reference to the accompanying drawings, taken in conjunction with the following discussion.

DETAILED DESCRIPTION OF THE PREFERRED EMBODIMENTS

Figure 1:
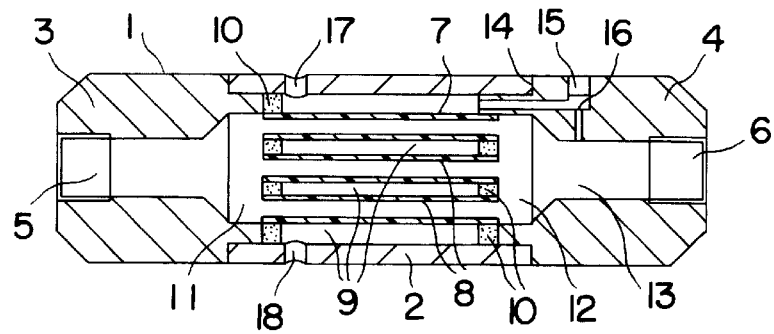
FIG. 1 shows an axial view of a known membrane dryer apparatus according to the current state of technology.

FIG. 1 shows a schematic illustration of a known membrane dryer apparatus which includes a housing having a cylindrical center piece 2 defining a drying chamber that is enclosed on both ends by covers 3 and 4. Attached to cover 3 is a connection 5 for input air to be dried in the hollow centerpiece 2, and cover 4 has a connection 6 for a line to carry dried output air to the user. Housing 1 can also be square or polygonal in shape depending on the particular application.

A fabric strand bundle 7 is located inside the hollow centerpiece 2 through which compressed air to be dried is carried. The individual fabric strands are made of selective absorption material which allows diffusion of water vapor whereby on the inside of the fabric water vapor is absorbed and then diffuses through the thin selective layer until the water vapor molecules reach the outside of the fabric membrane. The fabric strands 8 shown in FIG. 1 (and FIGS. 2 and 3 as well) are greatly enlarged, and are separated by spaces 9. As can be seen from the drawings, the spaces 9 near the end of the fabric strands 8 are closed off with sealing means 10, for example, perforated transverse walls.

Compressed air passing through connection 5 flows through cover 3 at intake 11 of the fabric strand bundle 7 and then flows through the fabric strands 8 to the side of discharge 12. The output air flows through cover 4 in the output air duct 13 to the connection 6 as dried output air. A scavenging air duct 14 containing a throttle screw 15 branches off the output air duct 13 at an angle and extends to the spaces 9 between the fabric strands 8 of the fabric strand bundle 7. As shown in FIG. 1, the scavenging air stream is adjustable by the throttle screw 15. The scavenging air stream branches off the main flow of output air and flows through the scavenging air duct 14, and its pressure is decreased as it flows through the throttle 16 in the duct, actuated by the throttle screw 15, and thereafter flows into the spaces 9 between the fabric strands 8 in the opposite direction to the air stream inside the fabric strands 8, thereby absorbing water vapor diffusing through the fabric strands 8. The scavenging air is then discharged together with absorbed water vapor to the outside near the intake 11 of the fabric strand bundle 7 and through discharge openings 17 and 18 in the interior wall of the centerpiece 2 of the housing. The output air flowing through connection 6 will be generally dry by this method.

FIG. 1 also shows that the scavenging air duct stays continuously open, except for closure of the throttle 16 by throttle screw 15, regardless of whether dried output air is being utilized by the user through connection 6 or not. This has the result that, especially during fluctuating air flow periods, the membrane dryer has continuously a relatively large scavenging air consumption, which can be over 30% of the total air amount flowing through the membrane dryer apparatus.

Figure 2:
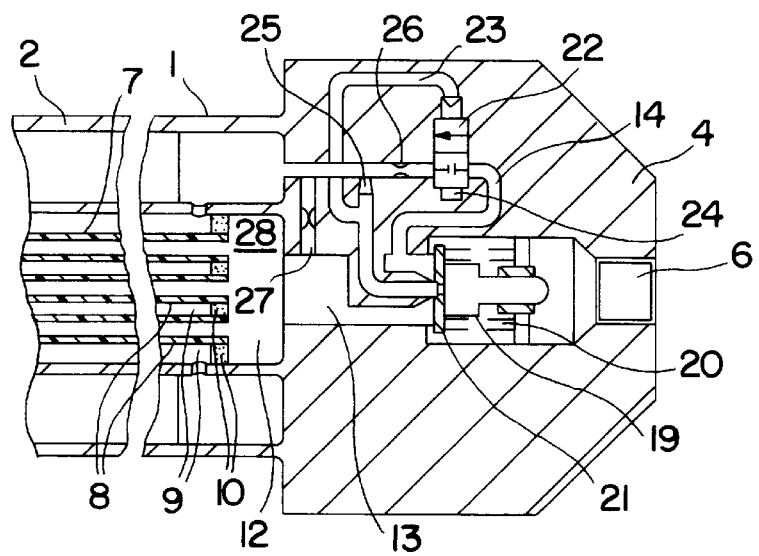
FIG. 2 shows an axial view of a preferred embodiment of a membrane dryer according to the present invention.

In the preferred embodiment of the present invention shown in FIG. 2, a self-acting shut-off valve 19 is installed which works as a flow sensor within the output air duct 13. This shut-off valve 19 is biased by a spring 20 and it closes the output air duct 13 whenever there is no demand for output air. The scavenging air duct 14 that branches off from the output air duct 13 upstream of the shut-off valve 19, has its own scavenging air valve 22, for example a 2/2-way directional control valve, which is actuated by its own control line 23 against the force of the counter spring 24. This control line 23 also originates at the output air duct 13 and is regulated by the seal unit 21 of the shut-off valve 19. The control line 23 is additionally equipped with a continuously open vent nozzle 25 that leads into the scavenging air duct 14.

The vent nozzle 25 allows release of pressure in the control line 23 as soon as the control line is closed by the seal unit 21 of the shut-off valve 19, which also allows the scavenging air valve 22, which is being actuated by the counter spring 24, to return to a closed position and thereby close the scavenging air line 14. In this embodiment, the scavenging air line 14 is also equipped with a throttle 26 which is located in the direction of air flow downstream of the scavenging air valve 22 and this throttle causes expansion of the flowing scavenging air.

A bypass duct 27 branches off the output air duct 13 at the side of discharge 12 of the fabric strand bundle 7 and this bypass duct 27, which also has a throttle 28 installed, leads into the scavenging air duct 14. The bypass duct 27 stays open continuously and ensures that a small amount of scavenging air flows through the fabric strand bundle 7 even when the shut-off valve 19 is closed. This has the result that the water vapor diffusing through the tubular fabric strands 8 of the fabric strand bundle 7 is absorbed even when the shut-off valve 19 is closed and therefore the membrane dryer continuously remains ready for operation. The bypass duct 27 aids furthermore in the drying of small amounts of flowing air that are below the tolerance of the shut-off valve 19.

Figure 3:
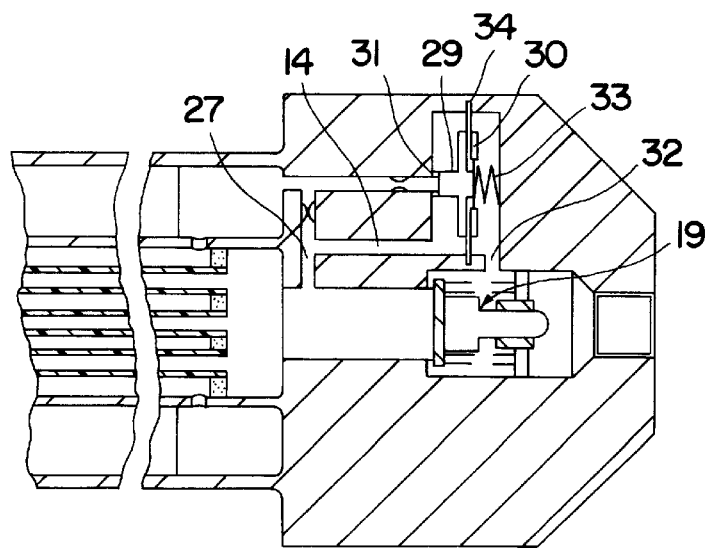
FIG. 3 shows an improved embodiment with membrane valve.

FIG. 3 shows an embodiment of the membrane dryer with a membrane valve 29 used as a scavenging air valve where the scavenging air duct 14 branches off from the bypass duct 27 and leads to the side of the membrane valve 29, where there is also a valve seat 31 located that is opened and closed with the seal element 30. Since the membrane valve 29 should be opened only during discharge of output air from the membrane dryer, an air passage 32 is added which leads from the area downstream of the shut-off valve 19 to that side of the valve seat 31 that is on the opposite side of seal element 30. The spring 33, if need be with the assistance of a predetermined tension of the membrane 34 bearing the seal element 30, ensures safe closing of the valve 29 as long as output air is not being discharged.

Although specific embodiments of the invention have now been shown and described, modifications therein can be made and still fall within the scope of the appended claims.

I claim:

1. A membrane dryer apparatus for drying moist air which comprises a housing that has an intake duct with a connection for incoming air to be dried and a discharge duct with a connection for discharging dried output air, a fabric strand bundle of tubular fabric strands made of selective absorption material for water vapor located in said housing and through which compressed air to be dried is channeled, said housing including a scavenging air duct connecting to said discharge duct and extending back to said fabric strand bundle inside said housing, said scavenging air duct including a throttle means whereby expanding scavenging air downstream of the throttle passes along the outside of said tubular fabric strands in an opposite direction to the air stream inside the fabric strands, said scavenging air absorbing the diffused water vapor passing through said fabric strands and subsequently flowing to the outside said housing near said intake of the fabric strand bundle, a self-acting shut-off valve located in said discharge duct, a scavenging air valve located in said scavenging air duct, and a control line which extends from said discharge duct to said scavenging air valve for actuation of said scavenging air valve, said control line being controlled by said shut-off valve.

2. The membrane dryer apparatus according to claim 1, wherein said scavenging air valve is a normally closed membrane valve which is biased to open by output air flowing from a point upstream of said shut-off valve and biased to close by output air flowing from a point downstream of said shut-off valve.

3. The membrane dryer according to claim 1, wherein said control line includes a continuously open vent nozzle.

4. The membrane dryer according to claim 3, wherein said vent nozzle leads into the scavenging air duct in the direction of the air flow and downstream of said throttle means in the scavenging air duct.

5. The membrane dryer according to claim 1, wherein a bypass duct for scavenging air is provided at the discharge side of said fabric strand bundle and upstream of the shut-off valve to extend from said output air duct to said scavenging air duct said bypass duct including an adjustable throttle.

* * * * *